Figure 1:
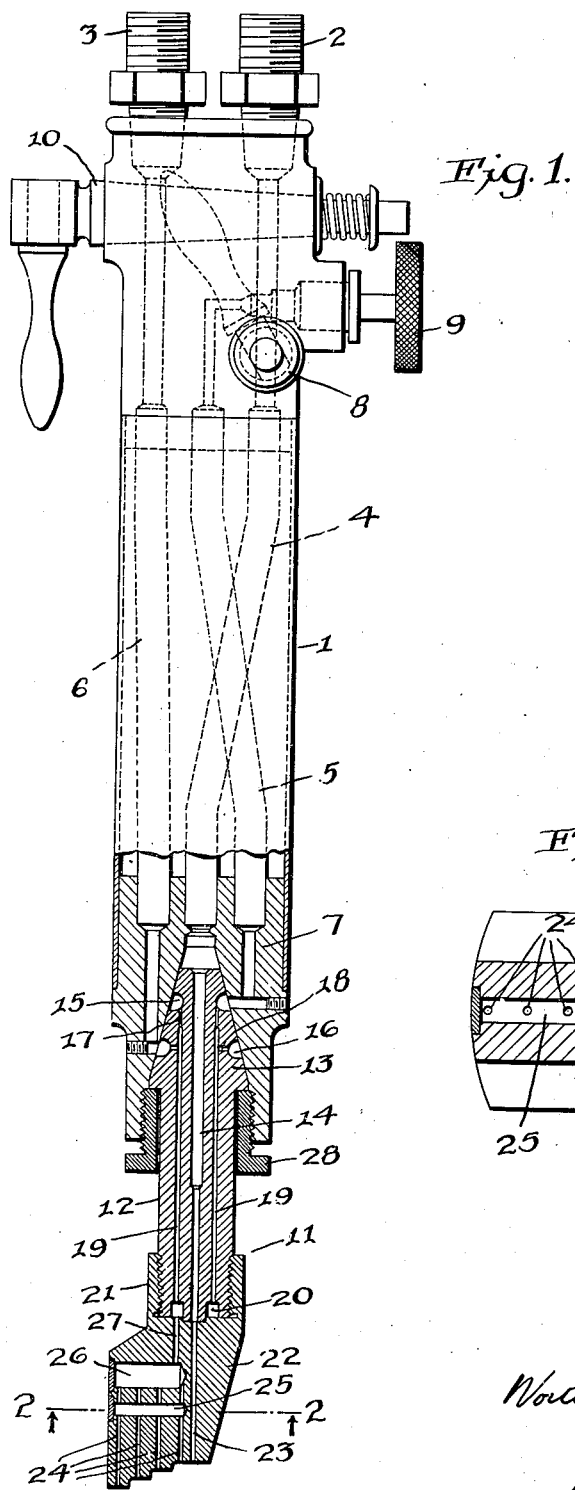

W. C. BUCKNAM.
CUTTING TORCH.
APPLICATION FILED FEB. 20, 1919.

1,377,001.

Patented May 3, 1921.

INVENTOR
Worthy C. Bucknam
BY
ATTORNEY

UNITED STATES PATENT OFFICE.

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

CUTTING-TORCH.

1,377,001.     Specification of Letters Patent.     Patented May 3, 1921.

Application filed February 20, 1919. Serial No. 278,201.

*To all whom it may concern:*

Be it known that I, WORTHY C. BUCKNAM, a citizen of the United States, and resident of Jersey City, in the county of Hudson and State of New Jersey, have invented a new and useful Cutting-Torch, of which the following is a specification.

The invention relates to cutting torches, and the object is to make possible continuous cutting in metal containing cracks, blow holes, or other interruptions in the line of cutting. To this end I provide the torch nozzle with a cutting jet orifice and means for delivering the heating mixture along a line extending in front of the cutting jet. The said delivery means may consist of a series of heating jet passages.

Figure 2:
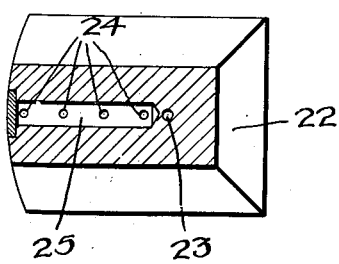

In the drawings forming a part hereof:

Figure 1 is a view of a torch embodying the invention, shown partly in side elevation and partly in longitudinal section; and Fig. 2 is an enlarged cross-section through the tip, on the line 2—2 of Fig. 1.

The torch body 1 is provided at the rear with connections 2 and 3 for attachment of flexible pipes, through which, respectively, oxygen and a combustible gas, such as acetylene or hydrogen, are conducted from sources of supply. The oxygen conduit within the body is branched, one part of the flow passing through a pipe 4 to supply the cutting oxygen jet and the other part passing through the pipe 5. The acetylene flows through the body of the torch in a pipe 6. The oxygen and acetylene of the pipes 5, 6 go to form the combustible mixture for the flame which heats the metal to the point at which it will be rapidly oxidized by the cutting jet of oxygen. The three conduits, 4, 5 and 6, deliver into the socket of a head 7. The cutting oxygen is controlled by an opening and closing valve 8 and the heating oxygen by a needle or adjustment valve 9. A common valve 10 may be provided for opening and closing the oxygen and acetylene conduits in advance of the branching of the oxygen passage. Similar features of cutting torch construction are disclosed in prior Patents 1,198,188 of September 12, 1916, and 1,254,637 of January 22, 1918.

The torch illustrated is of the kind having a removable tip adapted for sealing engagement with the head and containing the provisions for bringing together and mixing the constituents of the combustible mixture for the heating flame. In the preferred construction the tip 11 comprises a cylindrical stem 12 having a truncated conical rear end 13 to fit the cavity in the head 7. A central, longitudinal, drilled passage 14 communicates with the cutting oxygen conduit 4. Circumferential grooves 15 and 16 in the side of the cone communicate with the conduits 5 and 6. Properly proportioned inlet ports 17 and 18 admit the gases from the said grooves to longitudinal drilled mixing passages 19 at two or more sides of the cutting passage 14. The mixing passages 19 open at the forward ends into an annular channel 20.

The forward end of the stem 12 is screw-threaded to receive an internally threaded rear tubular extension 21 on a separate nozzle piece 22. The said nozzle piece is offset to one side of the longitudinal axis, and is provided with a longitudinal bore 23 which opens through the rear end of the nozzle piece and registers with the cutting passage 14. At the offset side of the said bore 23 the nozzle piece is provided with a series of small parallel heating jet passages 24, also delivering through the forward end, which is preferably stepped as shown. The said passages 24, but not the passage 23, are intersected by two transverse larger bores 25, 26, constituting header chambers, which effect a uniform distribution of the heating mixture between the several heating jet orifices. A single passage 27 in the rear part of the nozzle piece places the header chamber 26 in communication with the annular channel 20.

The tip is detachably connected to the head by a customary screw bushing or nut 28.

With a torch of this character the heating is extended along a line in advance of the cutting jet, enabling the cutting to proceed without interruption by cracks or fissures in the metal. While the present preferred embodiment has been described in detail, it will be understood that changes may be made without departing from the invention.

What I claim as new is:

1. Apparatus for cutting metal by means of an oxygen jet acting by virtue of the assistance of a heating flame burning a mixture of oxygen and a combustible gas, characterized by means for delivering such mixture in a line or strip extending in front of the cutting oxygen jet whereby the apparatus is enabled to cut across fissures.

2. A cutting torch having means for receiving and conducting oxygen and a combustible gas, forming a heating mixture of the gas and part of the oxygen and delivering the other part as a cutting jet, characterized by a nozzle part having means for delivering the heating mixture along a line extending in advance of the cutting jet.

3. A cutting torch having a cutting jet orifice and a plurality of heating jet orifices in line in front of the cutting jet orifice, with means for supplying oxygen under pressure through the cutting jet orifice and heating mixture through the heating jet orifices.

4. A cutting torch tip having a separate applied offset nozzle portion, a longitudinal cutting oxygen passage through the tip and nozzle, a series of longitudinal heating jet passages in the nozzle portion in front of the cutting jet passage, and transverse manifold chambers in the tip portion intersecting said heating jet passages but not the cutting jet passage.

WORTHY C. BUCKNAM.